United States Patent
Radun et al.

(10) Patent No.: US 12,341,428 B2
(45) Date of Patent: Jun. 24, 2025

(54) METHOD AND POWER DISTRIBUTION SYSTEM FOR GENERATING ELECTRICAL POWER

(71) Applicant: GE Aviation Systems LLC, Grand Rapids, MI (US)

(72) Inventors: Arthur Vorwerk Radun, Mason, OH (US); Xiaochuan Jia, Centerville, OH (US); Manish Ashvinkumar Dalal, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 18/314,477

(22) Filed: May 9, 2023

(65) Prior Publication Data

US 2024/0380322 A1    Nov. 14, 2024

(51) Int. Cl.
| | |
|---|---|
| *H02M 3/158* | (2006.01) |
| *H02M 7/06* | (2006.01) |
| *H02P 9/02* | (2006.01) |
| *B64D 41/00* | (2006.01) |

(52) U.S. Cl.
CPC ............. *H02M 3/158* (2013.01); *H02M 7/06* (2013.01); *H02P 9/02* (2013.01); *B64D 41/00* (2013.01); *B64D 2221/00* (2013.01)

(58) Field of Classification Search
CPC ................................................. H02M 3/158
USPC ............................................................ 307/31
See application file for complete search history.

(56) References Cited

U.S. PATENT DOCUMENTS

| | | |
|---|---|---|
| 6,448,751 B1 | 9/2002 | Becker |
| 7,335,999 B2 | 2/2008 | Potter et al. |
| 7,875,989 B2 | 1/2011 | Morris et al. |
| 8,148,850 B2 | 4/2012 | Bonnet et al. |
| 8,820,677 B2 | 9/2014 | Rajashekara et al. |
| 10,833,616 B1 | 11/2020 | Silverstein et al. |
| 10,855,216 B2 | 12/2020 | Rozman et al. |
| 11,605,957 B2 | 3/2023 | Wang |
| 2018/0337531 A1 | 11/2018 | Radun |
| 2019/0267833 A1* | 8/2019 | Collins ................. H02J 9/061 |
| 2021/0206501 A1 | 7/2021 | Krenz |
| 2021/0339877 A1 | 11/2021 | Salanne et al. |

* cited by examiner

*Primary Examiner* — Joseph Chang
(74) *Attorney, Agent, or Firm* — Thomas | Horstemeyer, LLP

(57) ABSTRACT

A method and apparatus for generating electrical power, including providing a generator configured to generate a first voltage, providing a voltage converter configured to operably down-convert the first voltage output to a second voltage output to provide a first amount of power to a set of electrical loads, and changing a power demand for at least a subset of the set of electrical loads, wherein the changed power demand increases the power demanded. To meet the increased power demand, the voltage converter is controlled to operably down-convert the first voltage output to the second voltage output to provide a second amount of power to the set of electrical loads. The second amount of power is greater than the first amount of power. The power-generating capabilities of the generator are not modified between providing the first amount of power and providing the second amount of power.

8 Claims, 7 Drawing Sheets

METHOD AND POWER DISTRIBUTION SYSTEM FOR GENERATING ELECTRICAL POWER

TECHNICAL FIELD

The disclosure relates to a method and apparatus for operating an electric machine assembly and more specifically to operating the electric machine in response to receiving a larger power demand.

BACKGROUND

Electric machines, such as electric motors or electric generators, are used in energy conversion. In the aircraft industry, it is common to combine a motor mode and a generator mode in the same electric machine, where the electric machine in motor mode functions to start the engine, and, depending on the mode, also functions as a generator. Regardless of the mode, an electric machine typically includes a rotor having rotor windings that are driven to rotate by a source of rotation, such as a mechanical or electrical machine, which for some aircraft may be a gas turbine engine. This power can be generated by conventional alternating current (AC) generators.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Figure 1:
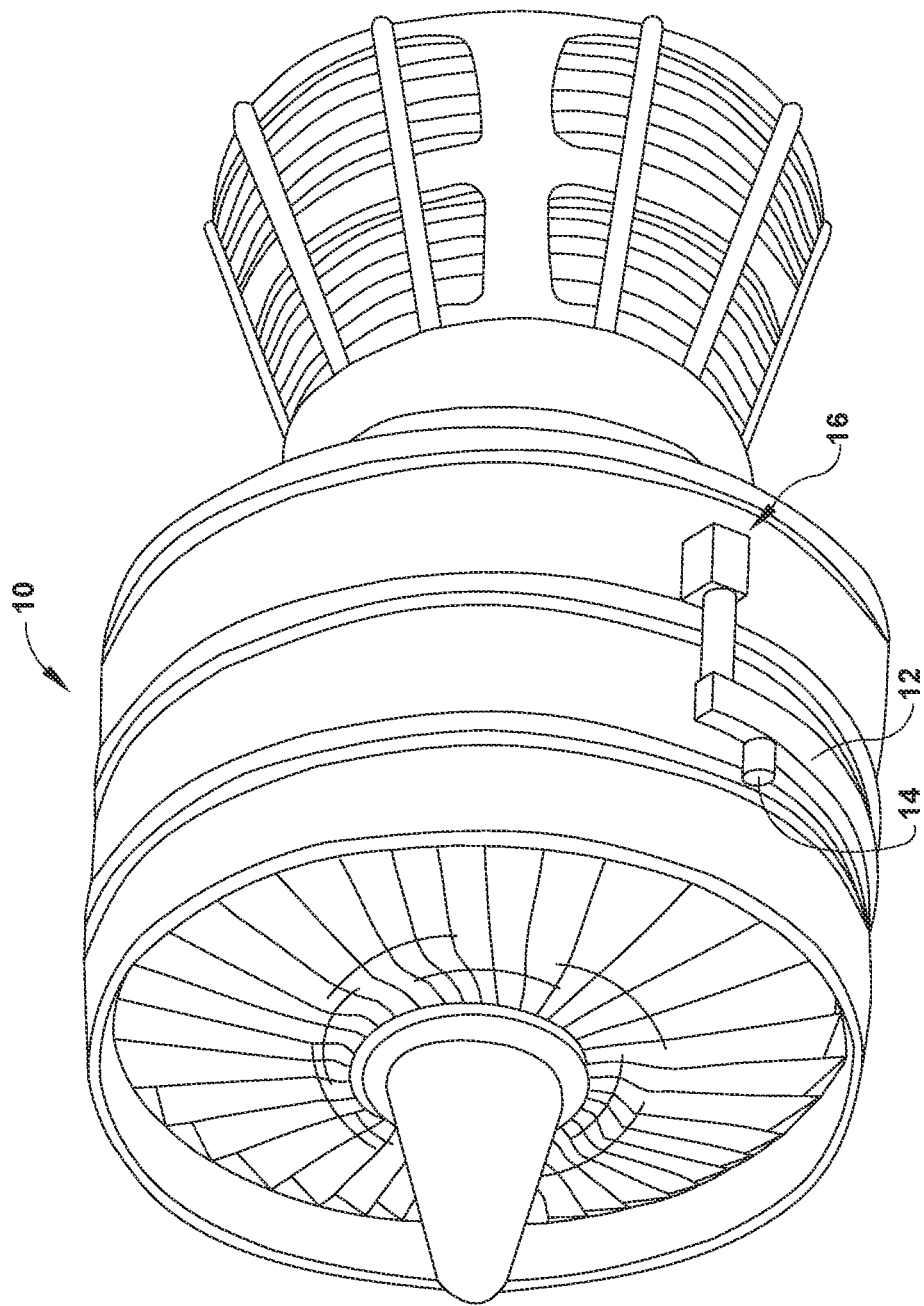
FIG. 1 is an isometric view of a gas turbine engine having a generator, in accordance with various aspects described herein.

Aspects of the present disclosure are described herein in the context of a power generation source for an aircraft, including a direct current (DC) power generation source, which enables production of electrical power from an energy source such as a turbine engine, jet fuel, hydrogen, batteries, etc. However, it will be understood that the disclosure is not so limited and has general applicability to power distribution systems or power generation systems (collectively, "power distribution systems" hereafter) in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

Traditional power distribution systems can include a power source electrically coupled to a primary distribution network or power bus, which can supply power to a secondary node or secondary distribution network coupled to various electrical loads. A communication system can further be included wherein communication modules can transmit data to the various electrical loads.

Power generation and power distribution systems can be designed, sized, or otherwise controlled, controllably operated, or controllably operable to generate an estimated, determined, predicted, or otherwise expected amount or quantity of electrical power to distribute to a set of electrical loads. Over a period of time, a set or a subset of electrical loads can be exchanged or replaced with new, newer, updated, or otherwise modified electrical loads. Additionally, or alternatively, over a period of time, a set or subset of additional electrical loads (for example, not replacing prior electrical loads) can be incorporated in the power distribution systems. The new, updated, or modified electrical loads can demand a modified expected amount of quantity of electrical power to be generated by the power generation of the power distribution systems. In some instances, the modified expected amount of quantity of electrical power to be generated to meet the modified power demand of the updated set of electrical loads can result in an overall higher or lower power demand for the power distribution system. Aspects of the disclosure can be included wherein, while the set of electrical loads and modified power demand can vary over a period of time for the power distribution system, the power generation capabilities of the power distribution system, such as the electrical machine(s) or generators, can controllably accommodate the modified power demanded without whole unit replacement or reconfiguration.

Additionally, in the presence of modified or altered power demands from a set of electrical loads, it is understood that the modified or altered power demands of the power generation and power distribution systems can result in voltage transients that are desired to be managed by the power distribution system. Accounting for, or enabling the power generation and power distribution system by reducing the voltage transient is desirable, but difficult to quickly correct based on the operational response of a generator system.

As used herein, the term "set" or a "set" of elements can be any number of elements, including only one. As used herein, the terms "axial" or "axially" refer to a dimension along a longitudinal axis of an engine or along a longitudinal axis of a component disposed within the engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

As used herein, the terms "tangential" or "tangentially" refer to a dimension extending perpendicular to a radial line with respect to the longitudinal axis of the engine or the longitudinal axis of a component disposed therein.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, while terms representative of electrical characteristics such as "voltage", "current", and "power" can be used herein, it will be evident to one skilled in the art that "electrical characteristic" terms can be interrelated when describing aspects of the electrical circuit, or circuit operations.

In one non-limiting example, as used herein, a "conventional" generator or power generation system can include any generator made or designed prior to the present disclosure. In another non-limiting example, as used herein, a "conventional" generator or power generation system can include any generator made or designed prior to the present disclosure in the aerospace field.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

As used herein, the term "additive manufacturing" generally refers to manufacturing processes wherein successive layers of material(s) are provided on each other to "build-up," layer-by-layer, a three-dimensional component. The successive layers generally fuse together to form a monolithic unitary component, which can have a variety of integral sub-components. Monolithic, as used herein, refers to a unitary structure lacking interfaces or joints by virtue of the materials of each layer fusing to or melting with the materials of adjacent layers such that the individual layers lose their identity in the final unitary structure.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

As used herein, a "module" that includes or incorporates, runs, operates, or otherwise executes or produces a functional operation or operative outcome, can be incorporated within or included by way of program code stored in a memory or executed by a controller module or processor.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The disclosure can be implemented in any electrical circuit environment having a switch. A non-limiting example of an electrical circuit environment that can include aspects of the disclosure can include an aircraft power system architecture, which enables production of electrical power from at least one spool of a turbine engine, such as a gas turbine engine, and delivers the electrical power to a set of electrical loads via at least one switch. One exemplary implementation can include a solid state power controller (SSPC) switching device, such as a silicon, silicon carbide (SiC) or Gallium Nitride (GaN) based, high power switch, in non-limiting examples. SiC or GaN can be selected based on their solid state material construction, their ability to handle high voltages and large power levels in smaller and lighter form factors, and their high speed switching ability to perform electrical operations very quickly. Another exemplary implementation can include a field-effect transistor (FET) switch, such as a metal-oxide-semiconductor field effect transistor (MOSFET) switch, which can be controlled by an applied voltage on the switch. Additional switching devices or additional silicon-based power switches can be included.

Aspects of the disclosure can be implemented in any environment using an electric machine or power generator. For purposes of this description, such an electric machine will be generally referred to as a generator, an AC generator, an electric machine assembly, or similar language, which is meant to clarify that one or more stator/rotor combinations can be included in the machine. While this description is primarily directed toward an electric machine providing power generation, it is also applicable to an electric machine providing both a driving force and power generation. For example, a generator can include a starter/generator, Multi-winding or output generators, or the like. Further, while this description is primarily directed toward an aircraft environment, aspects of the disclosure are applicable in any environment using an electric machine. Thus, a brief summary of a contemplated environment should aid in a more complete understanding.

As used herein, a "wet" cavity generator includes a cavity housing the rotor and stator that is exposed to free liquid coolant (e.g., coolant freely moving within the cavity). In contrast, a "dry" cavity generator the rotor and stator can be cooled by coolant contained within limited in fluidly sealed passages (e.g., non-freely moving about the cavity). Aspects of the disclosure can be applicable to both wet and dry cavity generators.

The exemplary drawings are for purposes of illustration only and the dimensions, positions, order and relative sizes reflected in the drawings attached hereto can vary.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines, such as a turboprop or turboshaft. The AGB 12 can be coupled to a turbine shaft (not shown) of the gas turbine engine 10 by way of a mechanical power take off 16. The type and specifics of the gas turbine engine 10 are not germane to the disclosure and will not be described further herein. While a generator 14, such as an AC generator, is shown and described, aspects of the disclosure can include any electrical machine or generator.

Figure 2:
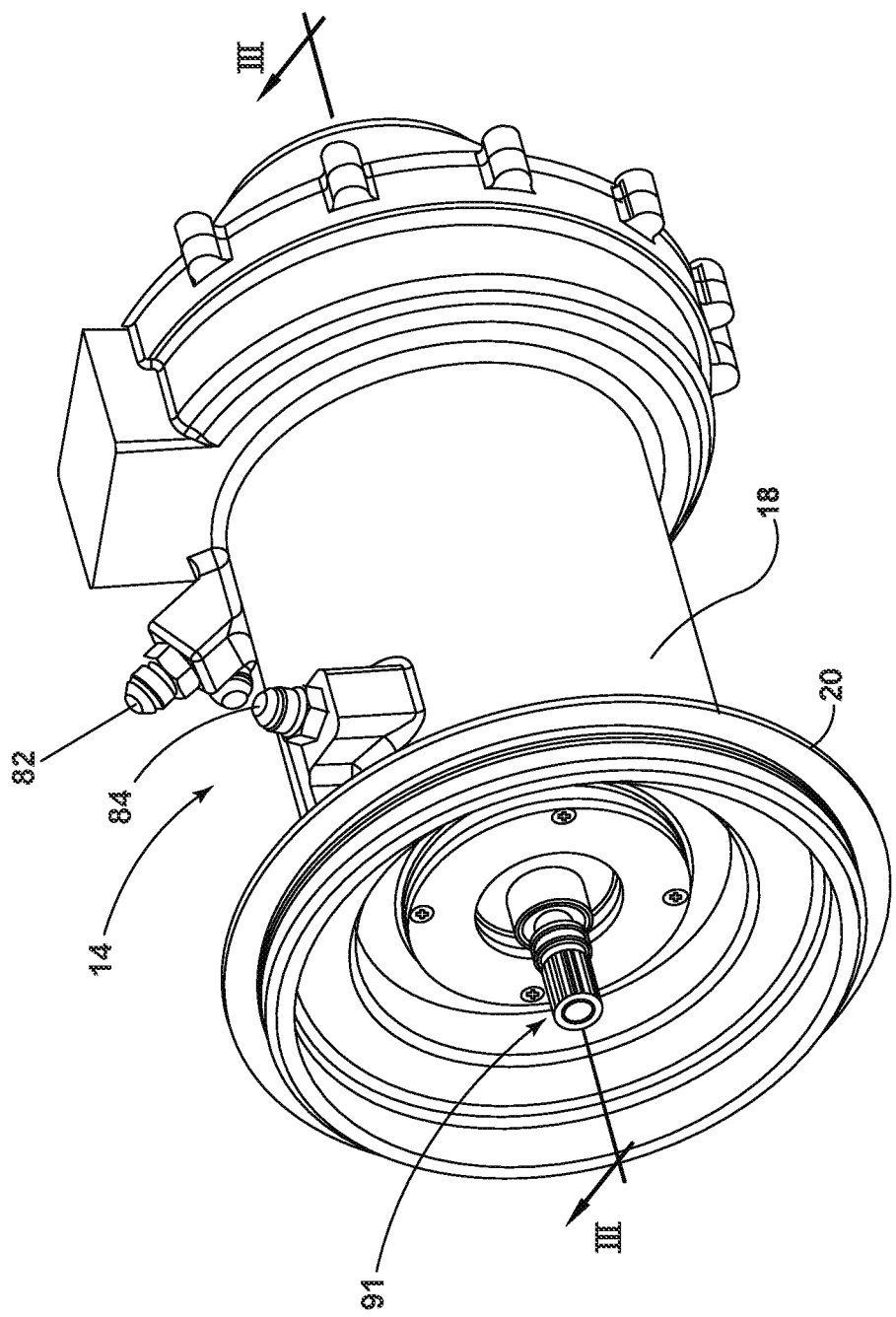
FIG. 2 is an isometric view of an exterior of the generator of FIG. 1, in accordance with various aspects described herein.
Figure 5:
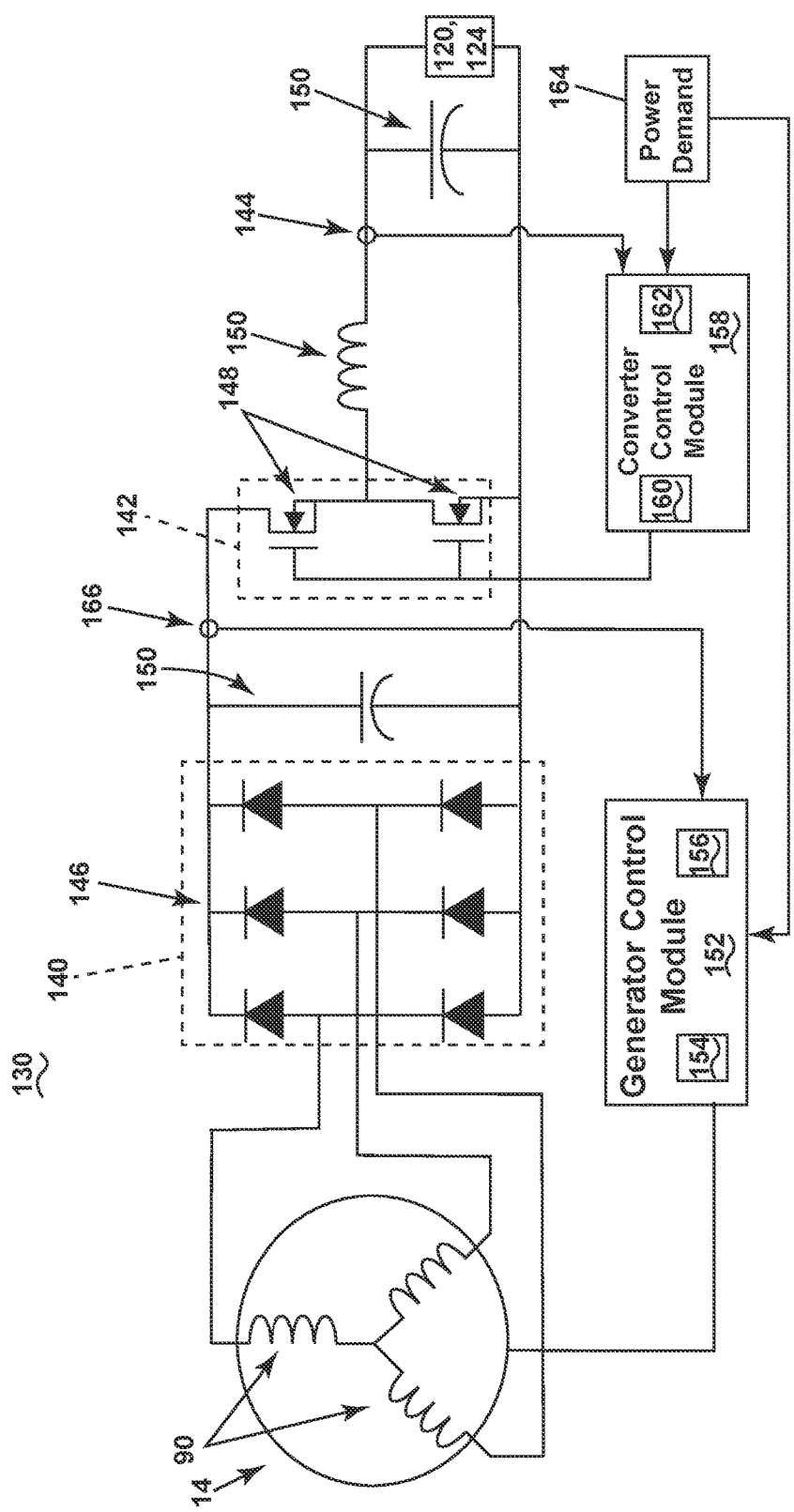
FIG. 5 is a schematic view of a power distribution system including a generator, such as the generator of FIG. 1, and including a voltage converter, in accordance with various aspects described herein.

FIG. 2 illustrates a non-limiting example generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to a rectifier, a converter (for example, as shown in FIG. 5), and then to an electrical power distribution node of an aircraft having the gas turbine engine 10 to power various items on the aircraft, such as an energizing electrical environmental control system, highly transient electrical loads, electrical deicing loads, lights, and seat-back monitors. In one non-limiting example, further components (e.g., the rectifier, the converter, or the like), can be integral with the generator 14, or can be located remotely, apart from, or separate from the generator 14. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a rotor or stator of the generator 14. The liquid cooling system can also include a second coolant outlet port 91, shown at a rotatable shaft portion of the generator 14. While not shown, aspects of the disclosure can further include other liquid cooling system components, such as a liquid coolant reservoir fluidly coupled with the cooling fluid inlet port 82, a rotatable shaft coolant inlet port, the cooling fluid outlet port 84, or a generator coolant outlet port, and a liquid coolant pump to forcibly supply the coolant through the ports 82, 84 or generator 14. While a liquid cooling system for a dry cavity generator is shown and described for understanding, aspects of the disclosure are applicable for any wet or dry cavity generator.

Figure 3:
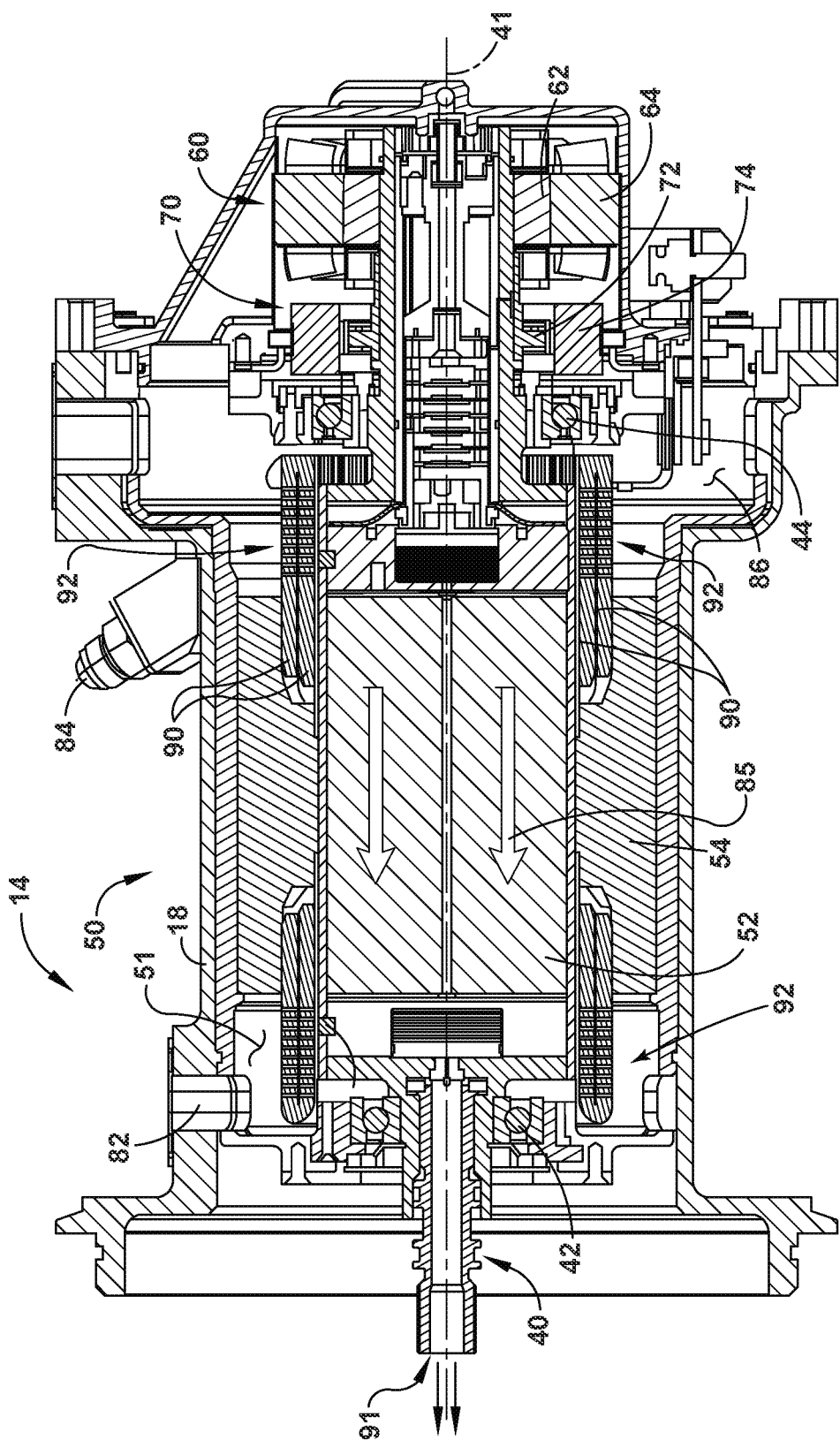
FIG. 3 is a schematic cross-sectional view of the generator of FIG. 2, taken along line III-III of FIG. 2, in accordance with various aspects described herein.

A non-limiting interior of the generator 14 is shown in FIG. 3, which is a cross-sectional view of the generator 14 shown in FIG. 2 taken along line III-III. A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51, an exciter 60, and a permanent magnet generator (PMG) 70. The corresponding rotating component includes a main machine rotor 52, an exciter rotor 62, and a PMG rotor 72, respectively, and the corresponding fixed component includes a main machine stator 54 or stator core, an exciter stator 64, and a PMG stator 74. In this manner, the main machine rotor 52, exciter rotor 62, and PMG rotor 72 are disposed on and co-rotate with the rotatable shaft 40. The fixed components can be mounted to any suitable part of the housing 18, and include the main machine stator 54, exciter stator 64, and PMG stator 74. Collectively, the fixed components define an interior through which the rotatable shaft 40 extends and rotates relative to.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54. In one non-limiting example, a cross-section of the set of stator windings 90 can define a cross-sectional area of one or more individual windings 90, in the direction of the rotational axis 41.

The components of the generator 14 can be any combination of known generators. For example, the main machine 50 can be either a synchronous or asynchronous generator. In addition to the accessories shown in this aspect, there can be other components that may need to be operated for particular applications. For example, in addition to the electromechanical accessories shown, there can be other accessories driven from the same rotatable shaft 40, such as the liquid coolant pump, a fluid compressor, or a hydraulic pump.

During power-generating operations, the rotation of the rotatable shaft 40 relative to the stationary generator components ultimately induces or generates current in the main machine stator windings 90, which is further provided to a generator power output (not shown). The generator power outlet can further supply the generated current to power or energize a set of electrical loads. Specifically, the rotation of a set of permanent magnets affixed to the PMG rotor 72 relative to the PMG stator 74 generates current in the PMG stator that is provided to the exciter stator 64. In turn, the rotation of the exciter rotor 62 relative to the energized exciter stator 64 generates current in the exciter rotor 62 that is further provided to the main machine rotor 52. The rotation of the energized main machine rotor 52 relative to the main machine stator 54 or set of stator windings 90 generates power output current provided to the generator power output, and to a set of electrical loads or an electrical bus.

Figure 4:
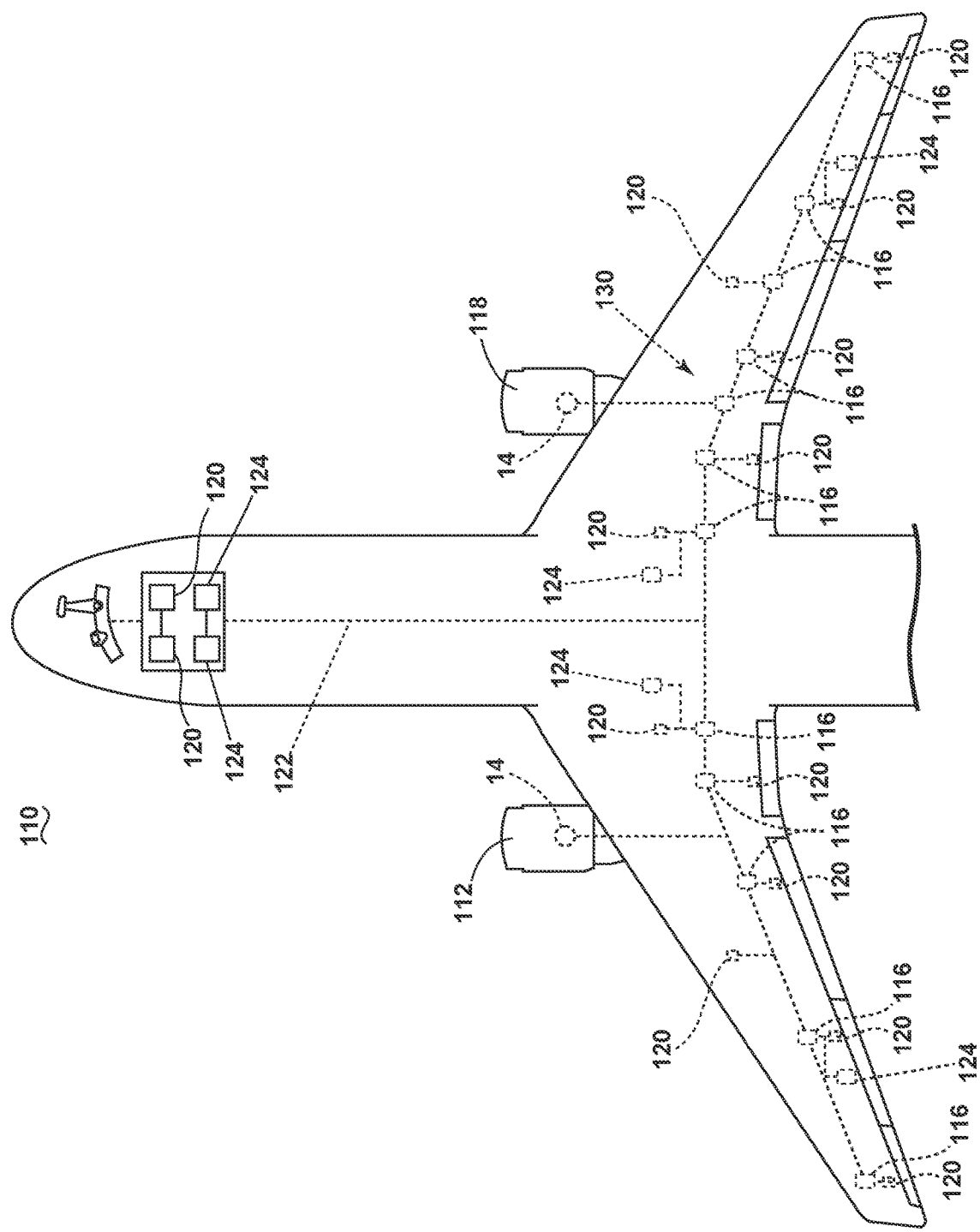
FIG. 4 is a top-down schematic view of an aircraft with a power distribution system including a generator, such as the generator of FIG. 1, and example electrical loads, in accordance with various aspects described herein.

Referring now to FIG. 4, a portion of an aircraft 110 is shown having at least one turbine engine including a generator, such as the generator 14. As shown, a left engine system 112 and a right engine system 118 can each include a respective generator 14. Alternatively, the power system can have fewer or additional engine systems. In one non-limiting example, the left and right engine systems 112, 118 can be substantially identical.

The left and right engine systems 112, 118 can further include another or additional respective power source(s), such as a second electric machine, a second generator, a battery power source, or the like. Non-limiting aspects of the disclosure can be included wherein, for example, the left engine system 112 includes a first generator 14 as a primary power source and a secondary generator as a secondary, back-up, or redundant power source.

The aircraft 110 can also include power-consuming components or a first set of representative electrical loads 120, such as for instance, an actuator load, flight critical loads, or non-flight critical loads. The electrical loads 120 can be located anywhere inside, outside, or otherwise disposed or located at or on the aircraft 110. As shown, the first set of electrical loads 120 can be distributed about the aircraft 110, for understanding, and can represent distinct or individual electrical loads 120 with varying electrical characteristics or power demands. Also illustrated, the aircraft 110 can include additional power-consuming components or a second set of representative electrical loads 124, different from the first set of electrical loads 120. Similar to the first set of electrical loads 120, the second set of electrical loads 124 can be distributed about the aircraft 110, for understanding, and can represent distinct or individual electrical loads 124 with varying electrical characteristics or power demands.

An exemplary power distribution system 130 is provided for electrically coupling the first set of electrical loads 120, the second set of electrical loads 124, or a combination or subset thereof, with at least one of the generators 14. The exemplary power distribution system 130 can include, for instance, a power distribution bus 122 (also referred to herein as "power bus 122"), such as a power transmission line or bus bar, as well as one or more power distribution nodes 116. In this manner, the power distribution system 130 and power distribution bus 122 can form part of an avionics system for the aircraft 110.

For understanding, the second set of electrical loads 124 can include electrical loads 124 not originally designed for, included, or otherwise present at the origination of the aircraft 110, the power distribution system 130, or the like. The second set of electrical loads 124 can include electrical loads 124 that can replace, or be exchanged with at least a subset of the first set of electrical loads 120, or can represent additional electrical loads 124 (as opposed to removing a subset of the electrical loads 120).

In non-limiting examples, it will be understood that over the expected lifespan or usage of the aircraft 110, power distribution system 130, generator system 14, or the like, at least a subset of the second set of electrical loads 124 can be added to the existing power distribution system 130 or aircraft 110. Some of this subset of the second set of electrical loads 124 can be improved systems, such as an updated radar system or module, or improved communication systems, such as updated satellite communications technology, or the like. In those instances, the updated or improved systems of the second set of electrical loads can replace existing, older, or outdated subsets of the original electrical loads 120. The added second set of electrical loads 124 can have increased power demands or electrical characteristics for the power distribution system 130, or reduced power demands or electrical characteristics for the power distribution system 130.

In another non-limiting example, the second set of electrical loads 124 can be optionally enabled or optionally energized electrical loads 124 that will be enabled or disabled during power distribution system operations, resulting in varying power demands for the power distribution systems 130. For example, a subset of the second set of electrical loads 124 can include electrical loads 124 that are only selectively enabled for a limited portion of the power distribution system's 130 operation, such as, for example, during a limited portion a flight (e.g., takeoff or landing operations, or particular operations).

In another non-limiting example, brand new (e.g., not replacing a legacy electrical load 120) electrical loads 124 can be added to the aircraft 110 or power distribution system 130 incorporating additional systems, such as additional navigation systems, generally increasing the power demands or electrical characteristics for the power distribution system 130. As understood, over the expected lifespan or usage of the aircraft 110, power distribution system 130, generator system 14, or the like, the overall power demands or electrical characteristics demanded from the power distribution system 130, the generator(s) 14, or a combination thereof, may vary with higher or lower power demands, in response to a changing first set of electrical loads 120 and second set of electrical loads 124.

During typical operations of the aircraft 110, the operating left and right engine systems 112, 118 provide mechanical energy, which can be extracted, typically via a spool, to provide a driving force for the generators 14. The generators 14, in turn, generate power, such as AC or DC power, and provide the generated power to the power distribution bus 122, which delivers the power to the present first set of electrical loads 120 and present or selectively energized second set of electrical loads 124 positioned throughout the aircraft 110.

Example power distribution management functions can include, but are not limited to, selectively enabling or disabling the delivery of power to particular one or more electrical loads 120, 124, depending on, for example, available power distribution supply, criticality of electrical load 120, 124 functionality, or aircraft mode of operation, such as take-off, cruise, or ground operations. Additional management functions can be included.

It will be understood that while aspects of the disclosure are shown in an aircraft environment of FIG. 4, the disclosure is not so limited and can have applicability in a variety of environments. For example, while this description is directed toward a power system architecture, power distribution system, or the like, in an aircraft, aspects of the disclosure can be further applicable to provide power, supplemental power, emergency power, essential power, or the like, in otherwise non-emergency operations, such as takeoff, landing, or cruise flight operations.

Furthermore, the number of, and placement of, the various components depicted in FIG. 4 are also non-limiting examples of aspects associated with the disclosure. For example, while various components have been illustrated with relative position of the aircraft 110 (e.g., the electrical loads 120, 124 on the wings of the aircraft 110, etc.), aspects of the disclosure are not so limited, and the components are not so limited based on their schematic depictions. Additional aircraft 110 configurations are envisioned.

FIG. 5 illustrates a schematic view of one non-limiting example of the power distribution system 130 having the generator 14, and operable to deliver electrical power to at least one electrical load, shown as a representative electrical load 120, 124. While only a single representative electrical load 120, 124 is illustrated, aspects of the disclosure are applicable to operably delivering, supplying, providing, conducting, or otherwise transmitting electrical energy or electrical power to any number of the first set of electrical loads 120, the second set of electrical loads 124, a subset thereof, or a combination thereof. It will be understood that FIG. 5 is one non-limiting example schematic view of the power distribution system 130, and additional components, routing of electrical power (including power distribution nodes, converters, etc.) power protection components, and the like, can be included in the power distribution system 130, but are not shown or described, for brevity.

As shown, a power output of multiphase power, generated at the set of stator windings 90, can be provided to a rectifier 140. The rectifier 140, shown in FIG. 5 as an example passive rectifier, can be configured to convert or otherwise rectify AC power generated at or by the generator 14 to a DC power output, provided to an output, illustrated as a rectified DC output at node 166. While a diode bridge 146 is illustrated as one example of a rectifier 140 utilized for rectifying an example 3-phase AC output from the generator 14, any number of rectifiers 140 can be included, and can further be adapted to rectify multiphase power of any number of phases.

The rectified DC power output can further be provided or supplied to a DC to DC converter 142, selectably or controllably operable to convert the rectified DC power output, defining a first set of electrical characteristics, to a converted DC power output, defining a second set of electrical characteristics. As shown, in one non-limiting aspect of the disclosure, the DC to DC converter 142 can further include a set of controllably switchable elements, shown as switches 148. Non-limiting aspects of the switches 148 can include solid state switching units, and can be controllable to vary the conversion of the rectified DC power output to the converted DC power output, based on at least one control schema. Stated another way, the DC to DC converter 142 is selectably operable such that it is not limited to converting a single predetermined DC input (having the first set of electrical characteristics) to a single predetermined DC output (having the second set of electrical characteristics).

The converted DC power output, for example, found at node 144, can be provided to the power distribution system 130 to operably supply or energize the present first set of electrical loads 120, the present second set of electrical loads 124, a subset thereof, or a combination thereof. While not shown, the converted DC power output can be operably supplied to the present first set of electrical loads 120, the present second set of electrical loads 124, a subset thereof, or a combination thereof, by way of the power bus 122, the one or more power distribution nodes 116, or the like, as explained herein.

Operable control of the power distribution system 130 can be enabled or allowed by way of one or more controllers or control modules. For instance, in one non-limiting example, as illustrated in FIG. 5, a generator control module 152 is included, having a processor 154 and a memory 156. In another non-limiting example, as illustrated in FIG. 5, a converter control module 158 is included, also having a processor 160 and a memory 162. While multiple control modules 152, 158 are shown and described, it will be understood that multiple operable or functional control modules 152, 158 can be enabled, operably controlling, or otherwise functionally implemented by way of a single processor 154, 160, control module 152, 158, power distribution system 130, or subsystem thereof. As used herein, the selectably, controllable, functional, enabling, or otherwise allowing operation of the control modules 152, 158 can be operably enabled by way of executable instructions stored in one or more memory units 156, 162, and executable by way of one or more processors 154, 160.

Operable control of the power distribution system 130 can be further enabled or allowed by way of one or more inputs provided to the respective generator control module 152, the converter control module 158, or a combination thereof. In one non-limiting example, one input provided to the one or more control modules 152, 158 can include the output voltage 144, a rectified voltage 166, a power demand input 164 representative of an actual power demand for the power distribution system 130, an expected power demand for the power distribution system 130, an estimated power demand for the power distribution system 130, a predicted power demand for the power distribution system 130, or a combination thereof. In another non-limiting example, the power demand input 164 can further be representative of a power demand for a period of time, a range of time, or the like (e.g., in one example, a predicted power demand for the upcoming one second of the power distribution system 130).

In non-limiting examples, the power demand input 164 can be based at least partially on the actual, expected, estimated, or predicted (or a combination thereof) power demand of the present first set of electrical loads 120, and, in some instances, the present second set of electrical loads 124. In this sense, it is understood that over the expected lifespan or usage of the aircraft 110, power distribution system 130, generator system 14, or the like, the power demands, the power demand input 164, or electrical characteristics demanded from the power distribution system 130, the generator(s) 14, or a combination thereof, may vary with higher or lower power demands, in response to a changing first set of electrical loads 120, second set of electrical loads 124, or a combination thereof. Non-limiting examples of the power demand input 164 can be based on communications of the power distribution system 130 (including the power bus 122, the one or more power distribution nodes 116), predefined aspects such as programmable power demands for one or more electrical loads 120, 124, a combination or sub-combination thereof, or the like.

In one non-limiting aspect of the disclosure, in response to receiving the power demand input 164, the generator control module 152 can operably control aspects of the generator's 14 power-generating capabilities. In another non-limiting aspect of the disclosure, in response to receiving the power demand input 164, the converter control module 158 can operably control aspects of the DC to DC converter 142 to operably control the variable conversion of the rectified DC power output to the converted DC power output, based on at least one control schema implemented by the converter control module 158.

Non-limiting aspects of the generator control module 152 can further operably control aspects of the generator's 14 power-generating capabilities based at least partially on additional inputs, such as by way of sensing or receiving power-generation feedback, shown as a representative feedback line sensing at least one electrical characteristic at the rectified DC output at node 166. In another non-limiting aspect of the converter control module 158, further operable control aspects of the DC to DC converter 142 can be at least partially based on additional inputs, such as by way of sensing or receiving power-conversion feedback or post-converter power output feedback, shown as a representative feedback line sensing at least one electrical characteristic at the converted DC power output at node 144. While not illustrated, non-limiting aspects of the disclosure can be included wherein the generator control module 152 and the converter control module 158 can be communicatively coupled with each other.

As illustrated, aspects of the power distribution system 130 can further include circuit components selected or adapted to ensure power delivery consistency, including, but not limited to, capacitors, inductors, or the like, and are not germane to aspects of the disclosure. These circuit components to ensure power delivery consistency mere non-limiting examples of components for completeness, and are indicated by numeral 150.

As used herein, the first set of electrical characteristics, such as the rectified DC power output, can define at least one of a first voltage or first DC voltage, a first current, a first voltage ripple, a first power output, or the like. Similarly, as used herein, the second set of electrical characteristics, such as the converted DC power output, can define at least one of a second voltage, or second DC voltage, a second current, second voltage ripple, a second power output, or the like. Additionally, while terms indicating a single value, (e.g., "a voltage" or "a current") are described, non-limiting aspects of the first set of electrical characteristics or the second set of electrical characteristics can include limited or bounded ranges (e.g., a voltage range, a current range, a ripple range, a power output range, etc.). In non-limiting aspects of the disclosure, the first set of electrical characteristics can be at least partially different from the second set of electrical characteristics.

Non-limiting aspects of the disclosure can be included where a generator 14 is operably provided or selected (for example, at original manufacture of the system or at original implementation, installation, or design), and as-provided, or as-selected, is capable or enabled to operably generate electrical power at a voltage level higher or larger than typically selected based on the power distribution system 130. For instance, in one non-limiting example, a power distribution system 130 of an aircraft can be based on a primary power bus 122 operating at 270 Volts DC (VDC), but the generator 14 can be provided or selected to be enabled to generate a rectified DC power output greater than, or larger than, 270 VDC, such as in one non-limiting example, 540 VDC. In this sense, the 540 VDC can include at least a portion of the first set of electrical characteristics of the rectified DC power output.

The power distribution system 130 can then operably control, enable, allow, or the like, the DC to DC converter 142 (for instance, by way of the converter control module 158) to operably convert the 540 VDC of the rectified DC power output to the expected or designed 270 VDC at the converted DC power output, which can then be supplied to the set of electrical loads 120, 124. In this sense, the 270 VDC can include at least a portion of the second set of electrical characteristics at the converted DC power output. As used herein, operating the DC to DC converter 142 to convert a first, higher or larger, DC voltage to a second, lower or smaller, DC voltage, can be referred to as "down-converting" or to operably "down-convert" the DC voltage.

Over the expected lifespan or usage of the aircraft 110, power distribution system 130, generator system 14, or the like, as the power demand for electrical power changes (as defined by the power demand input 164), larger or smaller quantities of power can be requested, required, or otherwise supplied, in response to a changing first set of electrical loads 120, second set of electrical loads 124, or a combination thereof. In one non-limiting example, a larger power demand, represented by the power demand input 164, can operably allow for or enable a selectably different DC to DC converter 142 operation or control schema, such that the generator's 14 rectified DC power output can be operably down-converted from, for example, 540 VDC to 270 VDC, but where the down-converting enables a larger quantity of power selectively supplied to meet the larger power demanded.

As described herein, a response time of the switches 148, the DC to DC converter 142, the control schema of the converter control module 158, a combination thereof, or the like, can be much faster than a typical conventional response time of altering the power-generating capabilities of a typical generator. In another non-limiting example, the described faster response time of the switches 148, the DC to DC converter 142, the control schema of the converter control module 158, a combination thereof, or the like, can ensure or enable the converted DC power output to stay within a set of designed or desired transient limits of the present set of electrical loads 120, 124, compared to a conventional response time of altering the power-generating capabilities of a typical generator.

These features can be accomplished while altering, modifying, replacing, and/or adding the additional second set of electrical loads 124 over a period of time or lifespan of the power distribution system 130 or aircraft 110, as described. The DC to DC converter's 142 down-converting allows for or enables this fast response, allowing for power demand responses to be less dependent on the load characteristics of the present electrical loads 120, 124. The DC to DC converter's 142 down-converting also operably provides fast load fault current limiting capabilities during power distribution system 130 operations. These features can also be accomplished without the need, or with a reduced need, for additional energy storage as all the transient energy is drawn from the generator. In contrast, some conventional systems alternatively employ an Electrical Accumulator Unit (EAU) that acts in parallel with the power system to provide at least a portion of the transient demands. Aspects of the current disclosure can avoid the use of, or operate without, an EAU, while providing the fast response described herein.

In this sense, new transient or modified transient power demands can be accounted for at the power generation system 130, with no degradation of the power generation system transient response, without having to modify the primary power generating capabilities, including but not limited to, altering the generator 14 operation, altering the generator 14 power-generating capacity or capabilities, physically modifying the generator 14, such as replacing a smaller-power-output generator with a larger-power-output generator, adding or modifying an EAU, or the like. Aspects of the disclosure can also allow for increased or improved power distribution system 130 performance that is less dependent on the nature of the present electrical loads 120, 124 (or variance or variation of the present electrical loads 120, 124), which allows for enhanced power protection. In one non-limiting example of enhancing or enhanced power protection, the DC to DC converter 142, or a solid state voltage converter, can be controlled to rapidly limit its output current (e.g., see at node 144) to a maximum value, a maximum expected value, a maximum specification value for the power distribution system 130, or the like, and supply this limited output current at node 144 (or to the present electrical loads 120, 124) while drawing a low current from node 166. In one non-limiting example, the DC to DC converter 142 can rapidly limit the output current in less than, or equal to, 100 microseconds.

As understood, a generator's response to voltage transients, such as by way of field control, as directed by a generator control module, can be too slow (in non-limiting examples, between and inclusive of 5 milliseconds and 20 milliseconds) to maintain a rectified DC output voltage within a desired or specified DC voltage range of a power distribution system. However, by incorporating aspects of the disclosure, where the generator 14 supplies a higher or larger rectified DC power output, a transient rectified output voltage can drop, yet still enable the fast response (in non-limiting examples, between and inclusive of 0.1 milliseconds and 0.5 milliseconds) DC to DC converter 142 to maintain the converted DC power output within a desired voltage transient value or range. The generated rectified DC output voltage compared with the converted DC power output can define a ratio incorporating aspects of the disclosure. As described in one non-limiting example, a ratio of 540 VDC rectified DC output voltage compared with 270 VDC converted DC power output can define a ratio of two, resulting in, in this example, a down-converting by the DC to DC converter 142 to maintain a converted DC power output transient voltage to the desired output value or range, even if or when a generator's 14 transient rectified output voltage drops in half.

Accordingly, the voltage transient at the output of the DC to DC converter 142 will be reduced compared to the voltage transient at the output of the generator 14 based at least in part on the fast response (described above) of a DC to DC converter 142 operation compared to a conventional generator's, or a conventional power distribution system's (described above) typical response. In a typical power distribution system, an energy storage device, such as larger and more expensive capacitors, can be utilized to make up the difference between the generated power and the otherwise desired electrical load power during the transient.

Additionally, aspects of the disclosure can be enabled without incorporating generator design modifications, such as, for example, lowering armature inductances of the generator windings, which would result in increasing the weight of the generator, including an electrical accumulator unit (EAU), utilizing an energy storage device to account for transient power supplies, or incorporating inverter technology to attempt to modify generator phasing, which would operably increase the AC electromagnetic interference (EMI) experienced by the generator.

While described aspects of the disclosure provide one non-limiting example of the rectified DC power output of 540 VDC, and the converted DC power output of 270 VDC, any number of rectified DC power outputs and the converted DC power outputs can be included in aspects of the disclosure. In one non-limiting aspect of the disclosure, the rectified DC power output can be equal to or greater than 800 VDC. In this sense, any rectified DC power output having or defining a first set of electrical characteristics having a DC voltage higher or larger than the DC voltage of the second set of electrical characteristics of the converted DC power output would incorporate the benefits of aspects of the disclosure. In one non-limiting aspect of the disclosure, a ratio value, as defined herein, of 1.3 or greater would allow for the benefits of the disclosure. In another non-limiting aspect of the disclosure, a ratio value, as defined herein, of 2.0 or greater would allow for the benefits of the disclosure. In one non-limiting aspect of the disclosure, the ratio can depend on the desired or anticipated generator transient response. For instance, larger ratios accommodate poor generator transient responses and very transient loads or transient load demands, while lower ratios reduce the generator transient response and allowed transient loads with a reduced weight DC to DC converter. Generally, a larger ratio would provide increased benefits, as described herein, by allowing for increasing voltage transients.

Figure 6:
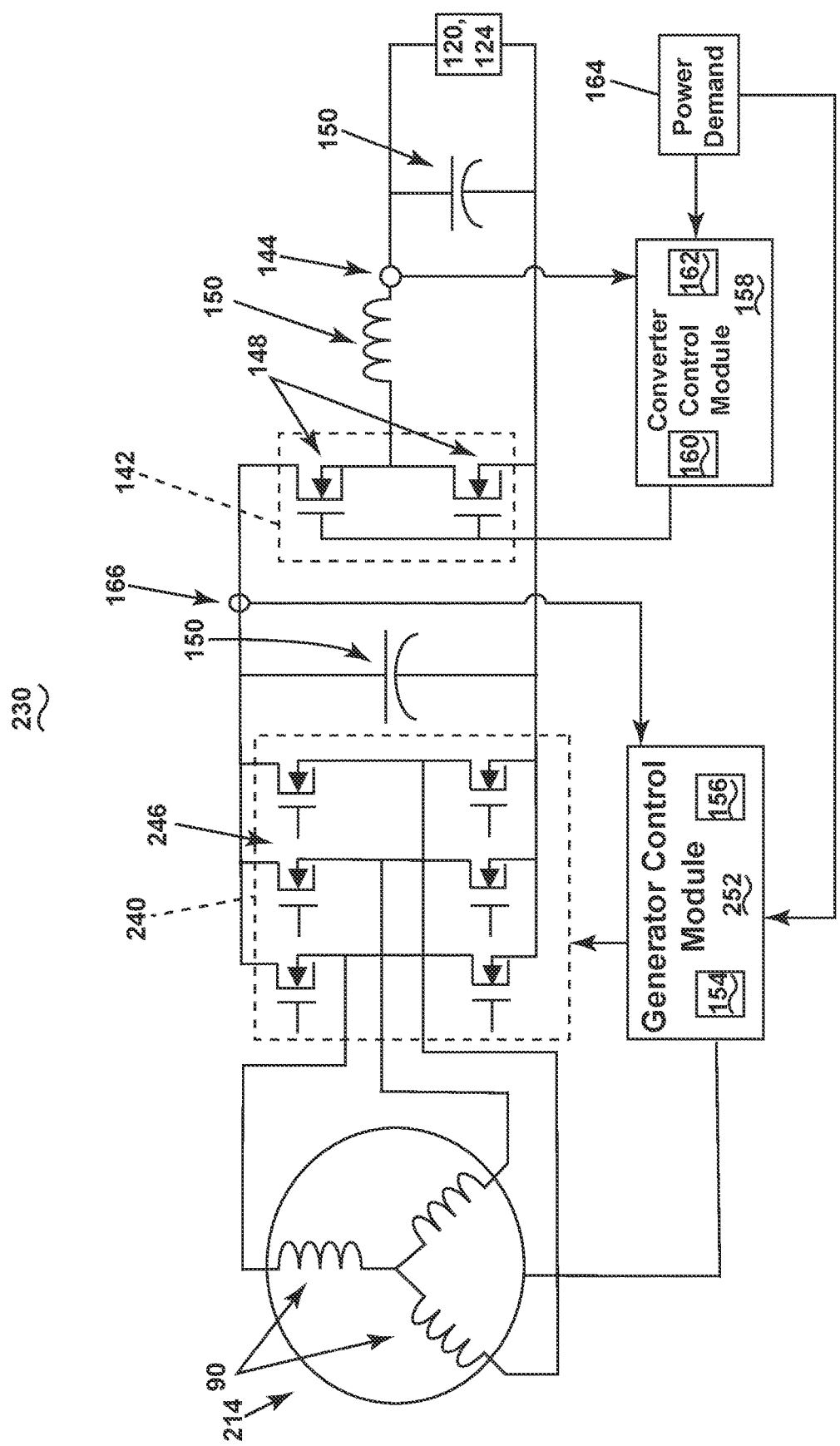
FIG. 6 is a schematic view of another power distribution system including an AC generator, a rectifier, and a voltage converter, in accordance with various aspects described herein.

Aspects of the disclosure can also be applicable to alternative or additional generator or power-generating configurations, or power distribution systems. For example, FIG. 6 illustrates another power distribution system 230 according to another aspect of the present disclosure. The power distribution system 230 is similar to the power distribution system 130; therefore, like parts will be identified with like numerals increased to 200, with it being understood that the description of the like parts of the power distribution system 130 applies to the power distribution system 230, unless otherwise noted. One difference is that the generator 214 of FIG. 6 can include a starter/generator (S/G) or starter/generator system. In this sense, aspects of the rectifier can include a controllable active rectifier/inverter 240 having a set of controllable switching units 246, and operable by way of, for example, the generator control module 252 to operably receive a starting power, either by way of the converted DC power output at node 144 (and operably converted or "up-converted" to a higher or larger DC voltage by the DC to DC converter 142), or by way of the DC power output at node 166. After a starting operation, the rectifier/inverter 240 can controllably operate during a power-generating operation, as described herein.

Figure 7:
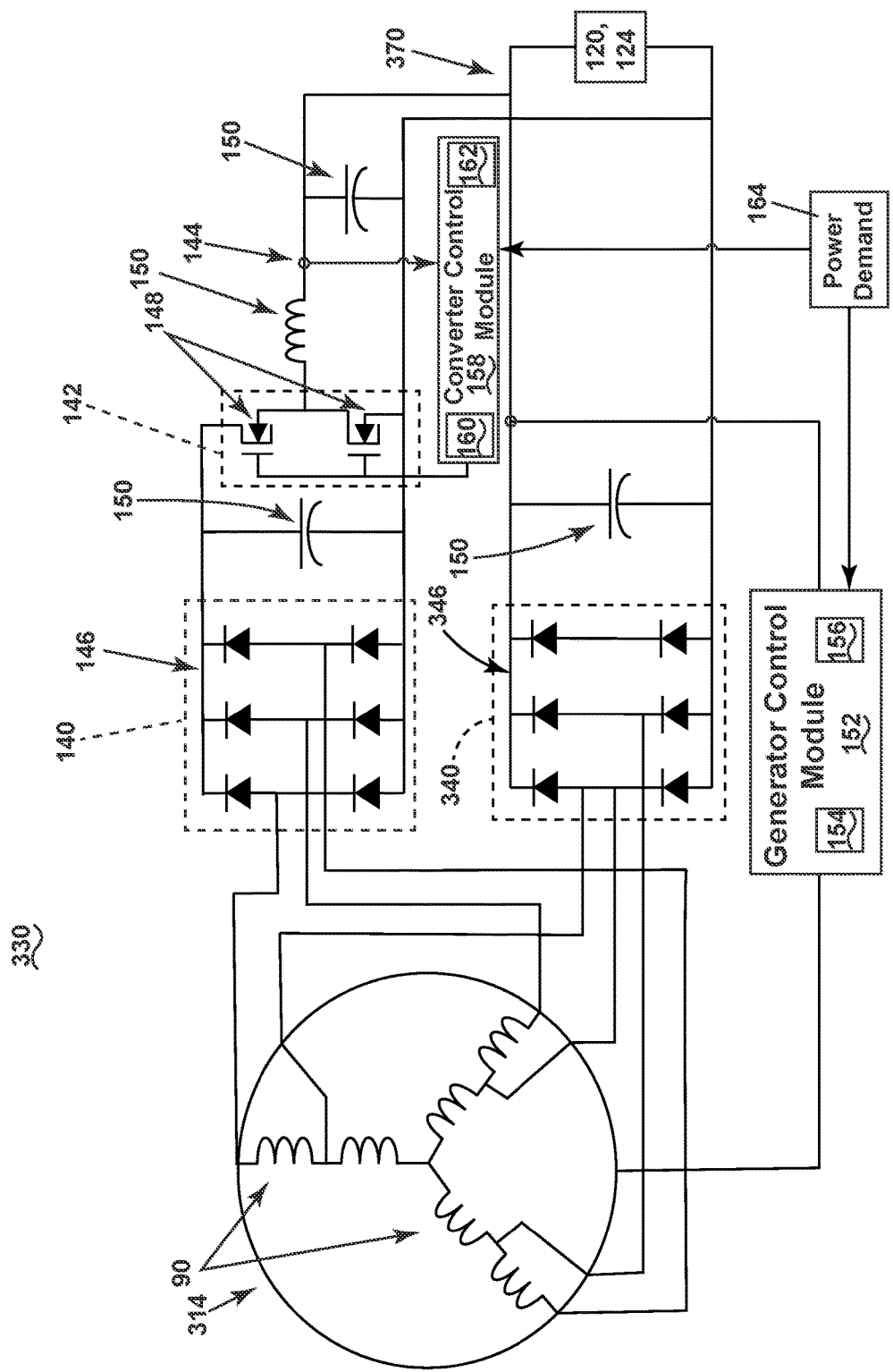
FIG. 7 is a schematic view of yet another power distribution system including a generator and a voltage converter, in accordance with various aspects described herein.

In another example, FIG. 7 illustrates another power distribution system 330 according to another aspect of the present disclosure. The power distribution system 330 is similar to the power distribution systems 130, 230; therefore, like parts will be identified with like numerals increased to 300, with it being understood that the description of the like parts of the power distribution systems 130, 230 apply to the power distribution system 330, unless otherwise noted. One difference is that the generator 314 can include a wound field generator 314 having autotransformer windings providing multiple outputs. A first, larger voltage output can be provided to a rectifier 140, rectified, and converted by a DC to DC converter 142 to a converted DC power output 144, as described herein. A second, smaller voltage output can be provided to a second rectifier 340 having a second diode bridge 346, rectified, and electrically coupled with the converted DC power output 144 to define a common power output 370, to be provided or operably supplied to the present set of electrical loads 120, 124. In this sense, the second, smaller voltage output can be selected such that the rectified smaller voltage can match the converted DC power output 144. Non-limiting aspects of the disclosure can be included wherein the power distribution system 330 can be supplied by the rectified smaller voltage of the generator 314, while the converted DC voltage output 144 can be utilized to supplement or account for the voltage transients or electrical load 120, 124 fluctuations in the power demanded 164.

The sequences described in this disclosure are for understanding purposes only and is not meant to limit aspects of the disclosure or the applicable methods of applying aspects of the disclosure in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to those shown in the figures are contemplated by the present disclosure. The aspects disclosed herein provide a method of providing a power distribution system for generating electrical power, whereby power generated can be rectified, down-converted, and supplied to meet a power demand for the power distribution system. The technical effect is that the above described aspects enable accounting for changes in transient power demand over a period of time based on variances in the energy-consuming electrical loads, by down-converting a higher voltage to a lower voltage, which can further reduce voltage transients without or with a reduced need for additional energy storage devices or reconfiguring or replacing the power generators.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The various features of the different aspects can be mixed and matched as desired to form new aspects, whether or not the new aspects are expressly described. Combinations or permutations of features described herein are covered by this disclosure. Further aspects of the disclosure are provided by the subject matter of the following clauses:

A method for generating electrical power, the method comprising providing a generator defining primary power generating capabilities including being configured to generate a first voltage output, providing a voltage converter configured to operably down-convert the first voltage output to a second voltage output to provide a first amount of power to a set of electrical loads, changing a power demand for at least a subset of the set of electrical loads, wherein the changed power demand increases the power demanded, and changing, by a controller module, the voltage converter to operably down-convert the first voltage output to the second voltage output to provide a second amount of power to the set of electrical loads, wherein the second amount of power is greater than the first amount of power, and wherein the primary power generating capabilities generator is are not physically modified between providing the first amount of power and providing the second amount of power.

The method of any proceeding clause, further comprising providing the second amount of power, generated by the generator, and down-converted by the voltage converter, to the set of electrical loads.

The method of any proceeding clause, wherein the providing the second amount of power meets the changed power demand.

The method of any proceeding clause, wherein the voltage converter is controlled to regulate its output voltage to a constant value while meeting the changed power demand.

The method of any proceeding clause, wherein providing the voltage converter configured to provide a first amount of power to a set of electrical loads to meet a first power demand, wherein the changed power demand is a second power demand, and wherein the second power demand is higher or lower than the first power demand.

The method of any proceeding clause, wherein the voltage converter is a direct current (DC) to direct current voltage converter.

The method of any proceeding clause, wherein a ratio of the second voltage to the first voltage defines a factor value, and wherein providing the generator further comprises providing a generator with a number of main windings turns increased by the factor value, compared with a conventional generator.

The method of any proceeding clause, wherein the main windings have a cross-sectional area reduced by the factor value, compared with the cross-sectional area of main windings of the conventional generator.

The method of any proceeding clause, wherein the generator is configured to generate a first voltage of 540 Volts DC, and wherein the voltage converter is configured to operably down-convert 540 Volts DC to a second voltage of 270 Volts DC.

The method of any proceeding clause, wherein the converter is controlled to regulate its output voltage to a constant value in less than or equal to 0.5 milliseconds, in response to the changed power demand.

The method of any proceeding clause, wherein the converter is controlled to regulate its output voltage to a constant value in less than or equal to 0.1 milliseconds, in response to the changed power demand.

A power distribution system, comprising a generator configured to generate electrical power at a generator power output, a set of electrical loads, a DC to DC converter having an input coupled with the generator power output and a converted power output coupled with the set of electrical loads, and a converter control module configured to operably control the DC to DC converter to convert power from the generator power output to a meet a first power demanded by the power distribution system to energize a first subset of electrical loads, and in response to at least one of replacing a subset of the set of electrical loads or adding an additional subset of electrical loads, the replacing or adding defining a second subset of electrical loads having a second power demanded by the power distribution system, operably control the DC to DC converter to convert power from the generator power output to a meet a second power demanded by the power distribution system to energize a second subset of electrical loads, wherein the second power demanded is greater than the first power demanded, and wherein the generator configuration is unchanged between the first power demanded and the second power demanded.

The power distribution system of any proceeding clause, wherein the generator is further configured to generate electrical power at a first DC voltage, wherein the set of electrical loads are configured to consume electrical power at a second DC voltage, and where the first DC voltage is greater than the second DC voltage.

The power distribution system of any proceeding clause, wherein a ratio of the first DC voltage to the second DC voltage is greater than or equal to 1.3.

The power distribution system of any proceeding clause, wherein a ratio of the first DC voltage to the second DC voltage is greater than or equal to 2.

The power distribution system of any proceeding clause, wherein the generator includes a rectifier to rectify alternating current (AC) power to the first DC voltage.

The power distribution system of any proceeding clause, wherein the at least one of replacing a subset of the set of electrical loads or adding an additional subset of electrical loads occurs when the power distribution system is not operating.

The power distribution system of any proceeding clause, wherein the at least one of replacing a subset of the set of electrical loads or adding an additional subset of electrical loads occurs during operation of the power distribution system as subsets of the electrical loads are selectively energized or deenergized.

The power distribution system of any proceeding clause, wherein the at least one of replacing a subset of the set of electrical loads or adding an additional subset of electrical loads occurs during power distribution system operation as subsets of the electrical loads are selectively energized or deenergized.

The power distribution system of any proceeding clause, wherein the DC to DC converter is configured to operably down-convert the generator power output to the converted power output.

A power distribution system, comprising a generator having a generator power output and being configured to generate electrical power at a first DC voltage at the generator power output, a set of electrical loads, and a DC to DC converter having an input coupled with the generator power output and a converted power output coupled with the set of electrical loads, the DC to DC converter being configured to down-convert the first DC voltage to a second DC voltage, the set of electrical loads being configured to consume electrical power at the second DC voltage, and wherein a ratio of the first DC voltage to the second DC voltage is greater than or equal to 1.3.

What is claimed is:
1. A power distribution system, comprising:
   a generator configured to generate electrical power at a generator power output;
   a set of electrical loads;
   a DC to DC converter having an input coupled with the generator power output and a converted power output coupled with the set of electrical loads; and
   a converter control module configured to:
     operably control the DC to DC converter to convert power from the generator power output to meet a first power demanded by the power distribution system to energize a first subset of the set of electrical loads; and
     in response to at least one of replacing a subset of the set of electrical loads or adding an additional subset of the set of electrical loads, the replacing or adding defining a second subset of the set of electrical loads having a second power demanded by the power distribution system, operably control the DC to DC converter to convert power from the generator power output to meet the second power demanded by the power distribution system to energize the second subset of the set of electrical loads;

wherein the second power demanded is greater than the first power demanded, and wherein the generator configuration is unchanged between the first power demanded and the second power demanded.

2. The power distribution system of claim 1, wherein the generator is further configured to generate electrical power at a first DC voltage, wherein the set of electrical loads are configured to consume electrical power at a second DC voltage, and where the first DC voltage is greater than the second DC voltage.

3. The power distribution system of claim 2, wherein a ratio of the first DC voltage to the second DC voltage is greater than or equal to 1.3.

4. The power distribution system of claim 2, wherein a ratio of the first DC voltage to the second DC voltage is greater than or equal to 2.

5. The power distribution system of claim 2, wherein the generator includes a rectifier to rectify alternating current (AC) power to the first DC voltage.

6. The power distribution system of claim 1, wherein the at least one of replacing a subset of the set of electrical loads or adding an additional subset of electrical loads occurs when the power distribution system is not operating.

7. The power distribution system of claim 1, wherein the at least one of replacing a subset of the set of electrical loads or adding an additional subset of electrical loads occurs during operation of the power distribution system as subsets of the electrical loads are selectively energized or deenergized.

8. The power distribution system of claim 1, wherein the DC to DC converter is configured to operably down-convert the generator power output to the converted power output.

* * * * *